(12) United States Patent
Sandström et al.

(10) Patent No.: US 6,334,148 B1
(45) Date of Patent: Dec. 25, 2001

(54) METHOD AND A MULTIPROTOCOL NETWORK CD-ROM SERVER FOR SHARING INFORMATION ON CD-ROM

(75) Inventors: Stefan Sandström, Lund; Patrik Bannura, Malmö ; Patrik Lindgren; Martin Gren, both of Lund, all of (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 09/090,019

(22) Filed: Jun. 3, 1998

Related U.S. Application Data (63) Continuation of application No. 08/576,407, filed on Dec. 21, 1995.

(51) Int. Cl.[7] ................................................. G06F 15/16
(52) U.S. Cl. ............................................. 709/219; 709/230
(58) Field of Search .................................. 709/230, 232, 709/246, 228, 250, 249, 217–219

(56) References Cited

U.S. PATENT DOCUMENTS

| | | | |
|---|---|---|---|
| 5,218,697 | * 6/1993 | Chung | 709/230 |
| 5,237,693 | * 8/1993 | Kiyohara et al. | 709/229 |
| 5,535,375 | * 7/1996 | Eshel et al. | 395/500 |
| 5,611,046 |   3/1997 | Russell et al. | 395/200.1 |
| 5,623,604 |   4/1997 | Russell et al. | 395/200.1 |
| 5,706,434 | * 1/1998 | Kremen et al. | 709/218 |
| 5,796,954 | * 8/1998 | Hanif et al. | 709/231 |
| 5,828,855 | * 10/1998 | Walker | 710/129 |

OTHER PUBLICATIONS

Tehkkath et al. Implementing Network Protocols at User Level. IEEE. Oct. 1993. vol. 1, No. 5. pp. 554–565.*

Ogle et al. Dynamically Selecting Protocols for Socket Applications. IEEE. May 1993. vol. 7, No. 3, pp. 48–57.*

PC Week; May 22, 1995; V. 12, No. 20, pp.10+; La Polla, Stephanie; Maidion and Axis case CD–ROM Access, bringing closer integration with network.

Network Computing; Nov. 1, 1995; V. 6, No. 14, pp. 104+; Koegler, Scott; SPANSter adds on network storage with case and convenience.

Computer Shopper; Nov. 1994; V. 14, No. 11, pp. 591+; Karnery, James; Learning to Share . . .

Lan Times; May 9, 1994; V. 11, No. 9, pp.45+; Snimmin, Bradley F.; Where no printer has gone before . . .

Intel Netport Express Print Server Internet advertisement; unattributed.

Intel Netport Express Press Release; Internet Document; unattributed; Intel Boosts Multi–NOS Support and Management Features in Netport . . .

Internetwork; Aug. 1995;V.6, No. 8, pp.32+; Slawter, Barry; Axis attaches CD–ROM's, eyes new markets.

Additional Ethernet, token–ring network CD–ROM Servers from Axis; Jul. 1995; V. 13, No. 7, pp.10+; The Token Perspectives Newsletter; unattributed.

The LocalNetter,; Jun. 1995; V. 15, No. 6, pp. 24+; Axis Communications debuts multiprotocol network CD–ROM Server for Ethernet,Token Ring; unattributed.

The Token Perspectives Newsletter; Jun. 1995, V. 13, No. 6, pp. 11+; unattributed; Axis Communications debuts multi-protocol Network CD–ROM Server for Ethernet, Token Ring.

* cited by examiner

*Primary Examiner*—Dung C. Dinh
*Assistant Examiner*—Nkosi Trim
(74) *Attorney, Agent, or Firm*—Cary & Kelly, LLP; Charles C. Cary (57) ABSTRACT

A method and a multiprotocol network CD-ROM server for providing computer network users possibility to share information on CD-ROM, regardless of other file servers and their locations. The CD-ROM server is a self contained piece of hardware. It provides users connected to different computer networks, using various network protocols, shared access to information of any CD-ROM disc inserted into a connected CD-ROM drive.

9 Claims, 5 Drawing Sheets

METHOD AND A MULTIPROTOCOL NETWORK CD-ROM SERVER FOR SHARING INFORMATION ON CD-ROM

This application is a Continuation of application Ser. No. 08/576,407, filed Dec. 21, 1995, which application(s) are incorporated herein by reference.

BACKGROUND OF THE INVENTION

1. Field of the Invention

The invention relates to CD-ROM (Compact Disc ReadOnly Memory) servers, and in particular to a method and a multiprotocol network CD-ROM server to provide for users, connected to different computer networks using various network protocols, shared access to information from any CD-ROM disc inserted into a connected CD-ROM drive.

2. Description of the Prior Art

Today, all kinds of information is available on CD-ROM discs: from software applications, image collections, illustrations and multimedia shows to encyclopedias, statistics, etc. Companies can use compact discs at low cost to store their own sales material, presentations, documentation, or any other company specific information. One problem is to make all these resources available to all users as in an organization. Users may be located in different workgroups, with different needs, and may even be using different computer systems with different software environment platforms.

CD-ROMs can be shared in many ways. In a small group of people, discs can be interchanged between computers with CD-ROM drives. In workgroups, one computer with a CD-ROM drive can be shared, giving several users access to the currently installed disc. CD-ROM drives and towers may even be connected to an existing file server. A regular PC could also be dedicated as a CD-ROM server.

CD-ROM sharing methods described above have limitations and cause problems. With local CD-ROM drives on every computer, no control over all CD-ROMs is possible, and no all-time access, no unlimited network, no multiple platform support, no flexible placing of CD-ROM drives (just local), and no easy disc updates and administration are provided. If workgroup sharing of computers with CD-ROM drives is used, the same problems and limitations remain, as if local CD-ROM drives on every computer are used, except that the unlimited network and the flexible placing of CD-ROM drives are within a workgroup. As described above, the CD-ROM drives can be connected to an existing file server. If this configuration is used, control over all CD-ROMs is provided, the all time access depends on the server, the network is unlimited, the multiple platform support depends on the server, the flexibility in placing CD-ROM drives is at the file server, and it depends on the server, whether easy disc updates and administration are possible. If a regular PC is dedicated as a CD-ROM server control over all CD-ROMs is possible. All-time access and unlimited network are provided, but multiple platform support is not provided by default, and no flexible placing of CD-ROM drives is possible since a PC is needed as server.

State of the art CD-ROM servers intended to provide users connected to a network are completely dependent on the functionality of a regular file server, and consequently they can not work as a stand-alone device.

SUMMARY OF THE INVENTION

The primary object of the present invention is to overcome the limitations of prior art system solutions as mentioned above.

The present invention provides a method and a multiprotocol network CD-ROM server for providing users connected to different computer networks using various network protocols, which networks are attached to said multiprotocol network CD-ROM server regardless of other file servers and their locations, with shared access to information from any CD-ROM disc inserted into a connected CD-ROM drive. A module network in the CD-ROM server contains a protocol stack. The module network receives a data packet from a sender via the computer network.

The module network finds out the transport protocol used in said packet by identifying the contents of the packet. Referring to the contents an appropriate network submodule creates a so called inpacket according to the transport protocol used. The module network activates a module job, which is responsible for executing a decoding job. An application protocol dependent module decodes the packet and translates the contents into file system operations according to the application protocol used.

BRIEF DESCRIPTION OF THE DRAWINGS

Further objects and features of the invention will be apparent from the following description of preferred illustrative embodiments thereof reference being made to the accompanying drawings, in which.

DESCRIPTION OF A PREFERRED EMBODIMENT

Figure 1:
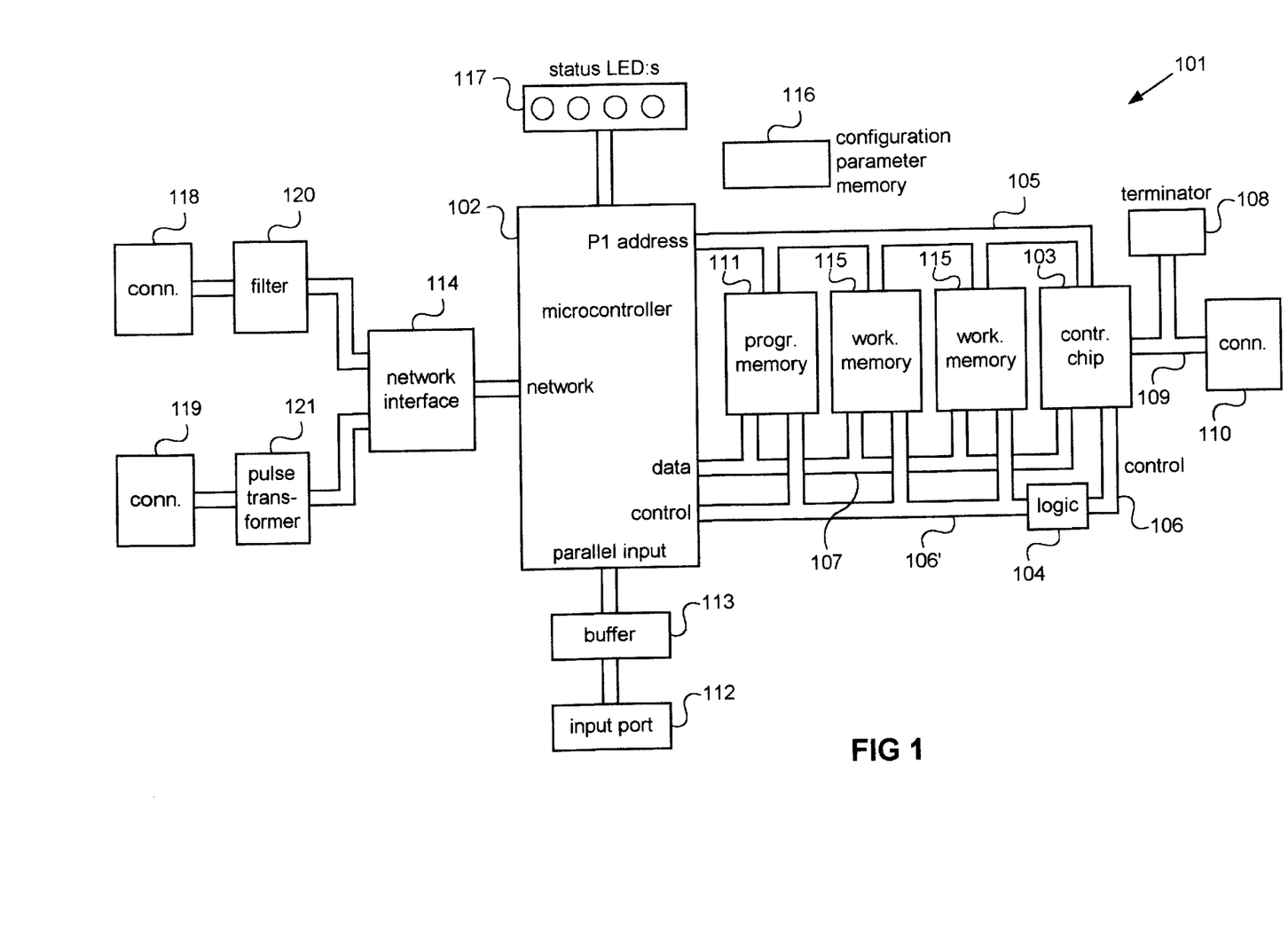
FIG. 1 shows a block diagram of a multiprotocol network CD-ROM server.

A multiprotocol network CD-ROM server 101 shown in FIG. 1 is an apparatus that provides computer network users with the possibility to share information contained on CD-ROMs. All users on a computer network or different networks, regardless of the computer systems and software environment platforms used, may share the information from any CD-ROM inserted into a connected drive.

The CD-ROM server 101 comprising a self contained piece of hardware and a system environment, as described above, may be attached to a network regardless of file servers and their locations, and supports multiple protocols for user access.

1. Hardware

A first embodiment of the CD-ROM server 101 is shown as a block diagram in FIG. 1. This CD-ROM server 101 consists of different ports, memory modules, a microcontroller, control logic, and computer network attachment means, all of which are mounted on one or more PCBs (Printed Circuit Boards) to be described in detail below.

Several specific details, such as circuit types, protocol types etc., are provided in order to provide a more thorough description of the present invention. It will be understood, that the present invention may be practiced with other similar details than those mentioned herein. Features well-known to the man skilled in the art are not described in detail so as not to make the present invention overshadowed.

The hardware design is based on a microcontroller 102, in the preferred embodiment a microcontroller manufactured by AXIS COMMUNICATIONS AB of Lund, Sweden and marketed under the trade name ETRAX AXT 6200, in combination with a controller chip 103, in the preferred embodiment an NCR53CF94-2, manufactured by NCR Corporation, or an AMD (Advanced Micro Device) Am53CF94 Fast SCSI-2 controller chip manufactured by AMD Corporation. SCSI-2 is an ANSI-standard (ANSI= American National Standard Institute) with the number X3.131-1994. The microcontroller 102 comprises a CPU (Central Processing Unit), an on chip or off chip network controller, and other peripherals.

The controller chip 103 handles the communication with CD-ROM drives and is controlled by the microcontroller 102 via a block of logic 104 (glue logic in the embodiment). The controller chip 103 and the logic 104 may, as a modification, be integrated with the microcontroller 102. An address bus 105 is at one end thereof connected to an address output of the microcontroller 102 and at the other end thereof to an address input of the controller chip 103. The controller chip 103 is connected to the microcontroller first via control lines 106, through the logic 104, further via control lines 106' to a control line input of the microcontroller 102. Control signals are transmitted between the controller chip 103 and the microcontroller 102 on a data bus 107.

A terminator 108 is connected to a communication bus 109. An active terminator including a UC5601, manufactured by Unitrode Corporation, or a similar device, is used in the preferred embodiment to eliminate the common problems with passive termination. It is also possible to use a passive termination in another embodiment. The bus 109, connected to the controller chip 103 and to CD-ROM drive connection means 110, is used to transmit control signals, data, and addresses between the CD-ROM server 101 and connected CD-ROM drives.

The connection means 110 makes it possible to connect several CD-ROM drives to the CD-ROM server 101. In the preferred embodiment the connection means 110 is a SCSI-2 connector, which makes it possible to connect up to seven CD-ROM drives. The CD-ROM drives connected could be either internal or external. If a CD-ROM drive is internal, it is arranged within a box in which the CD-ROM server is mounted, and if it is external it could be placed anywhere within the recommended maximum cable-length.

As previously described, the CD-ROM server supports different network protocols. For Token Ring® versions using a 32 MHz system clock the maximum synchronous mode SCSI bus speed is 8 MB/s, and for Ethernet® versions using a 20 MHz system clock the bus speed is 5 MB/s. The PCB is prepared for mounting of more than one crystal, for example two crystals: one 32 MHz for a microcontroller system clock and one 20 MHz for an Ethernet® serial interface.

All software is downloaded to a program memory 111. It is addressed via the address bus 105 and data is transmitted to/from the microcontroller 102 on the data bus 107. The CD-ROM server 101 has an input port 112, preferably a parallel port, which is used not only during development but also for downloading the system software to the program memory 111 before delivery. The port 112 is buffered in a buffer 113 (not necessary for the functionality) to protect the microcontroller 102 from electrical damages, which buffer 113 in the preferred embodiment consists of a 74LS245 and a 74LS38 circuit. This buffer 113 is connected to a parallel or serial input of the microcontroller 102. Via a network interface 114 (in the embodiment an Intel® 82503IC for Ethernet®, manufactured by Intel, Inc., USA, and a Texsas Instrument® TMS38054 IC for Token Ring®) connected to a network input of the microcontroller, the software stored in the program memory 111 may be updated in the field. In the preferred embodiment, the program memory 111 consists of FLASH PROMs, Am29F040, manufactured by AMD, or compatible units.

Further, the CD-ROM server 101 has a working memory 115 or RM (Random Access Memory) consisting of an SRAM (Static RAM) module as standard and a DRAM (Dynamic RAM) module as option in the preferred embodiment. The working memory 115 is also connected to the common address bus 105 and the data bus 107. The working memory 115 may comprise other types of RAM or RAMs with different storage capacity. In the preferred embodiment DMA (Direct Memory Access) is used, wherein data are transferred between the controller chip 103 and the working memory 115. The DMA is controlled by the microcontroller 102.

A non-volatile memory (a serial EEPROM in the embodiment), connected to a microcontroller general purpose port, is used as a configuration parameter memory (CPM) 116. In accordance with the name, said memory CPM 116 stores parameters to adjust the behavior of the server.

Status LEDs 117, visible at the front panel of a CD-ROM server, indicate during operation, for example, if a CD disc is inserted into the internal drive, if the CD-ROM server is working on the computer network, if the power is on, or some other status information. The LEDs are also connected to the same port at the microcontroller 102, in the embodiment, as the CPM 116 but may also be connected to some other port in other embodiments.

Various connectors (in the embodiment network connection means 118 and 119) are used as computer network attachment means depending on the network type. In Ethernet® versions of the CD-ROM server connection means 118 can be a 10BaseT connector, for connection to twisted-pair Ethernet®, and connection means 119 can be an AUI (Attachment Unit Interface) 10base5 connector. Token Ring® versions of the CD-ROM server have connectors for attachment both to STP (Shielded Twisted Pair for Media Type 1) and to UTP (Unshielded Twisted Pair for Media Type 3) networks. The connection means 118 and 119 are interfaced to the microcontroller 102 via a filter 120, in the embodiment a 10BaseT filter, and a pulse transformer 121, respectively, and further via the network interface 114 to the microcontroller.

Different types of power supply, not shown in the drawings, could be used. In this embodiment a power supply unit should deliver at least 5V 1.2A and 12V 2.0A from an external 12V DC supply. In the embodiment a voltage supervisor circuit not shown, a Texas Instrument® TL 7705 manufactured by Texas Instrument®, Inc., USA, or a similar device is used, which resets the unit when the 5V supply drops below 4.5V. Voltage and current levels depend on the type of circuits used, TTL, CMOS etc, and may therefore be different in other embodiments.

Figure 2:
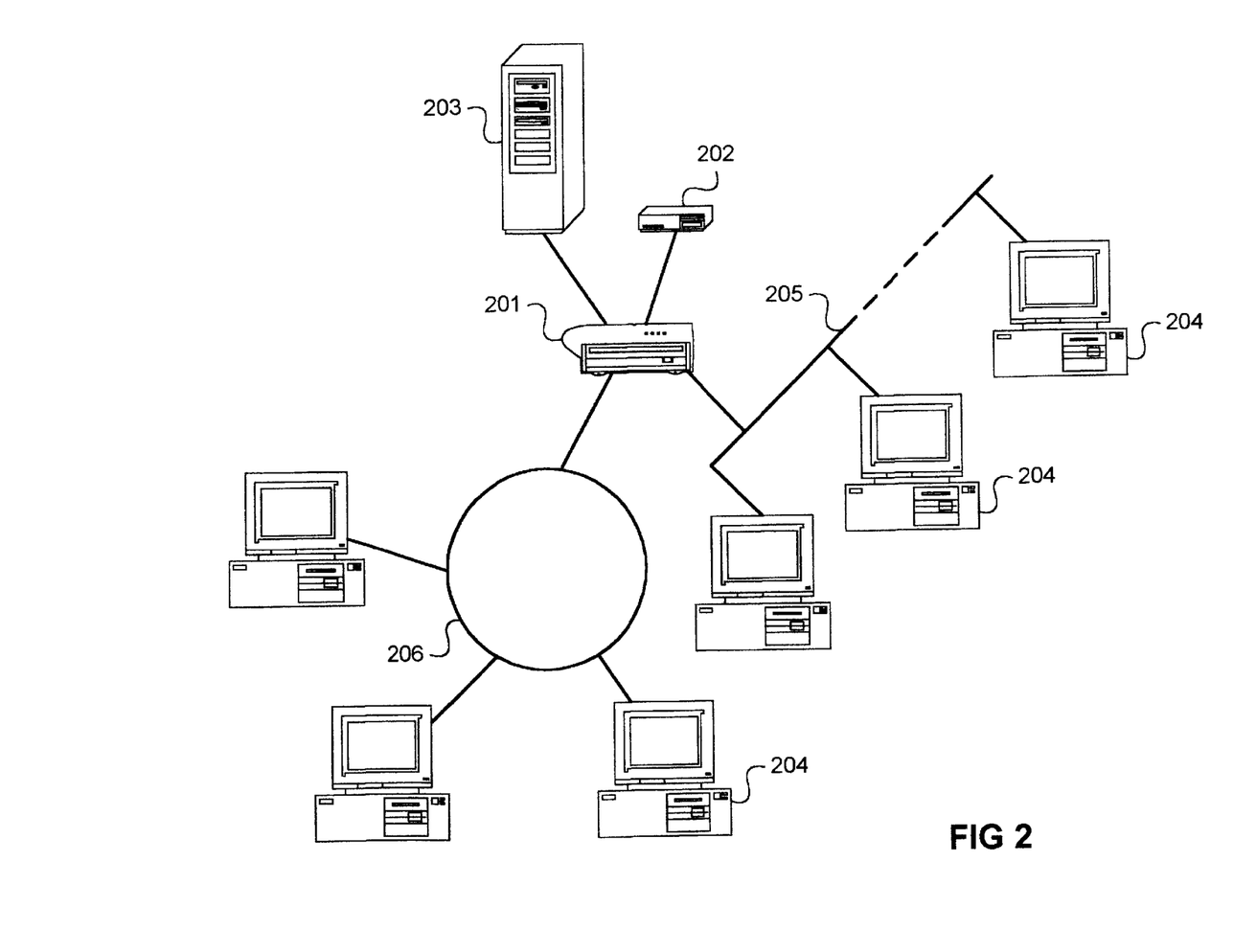
FIG. 2 shows a network configuration including the CD-ROM server shown in FIG. 1.

FIG. 2 shows a possible computer network configuration, comprising a complete network CD-ROM server cabin 201, including the CD-ROM server 101 according to FIG. 1, attached to an external CD-ROM drive 202, a CD-ROM tower 203 including one or more CD-ROM drives, and several computer systems 204 using different platforms each, for example Windows™, UNIX®, DOS®, OS/2®, etc. Some computer systems 204 are connected to a computer network 205, for example an Ethernet® network, and some computer systems 204 are connected to another different computer network 206, for example a Token Ring® network.

Other computer network configurations than that of FIG. 2 including the CD-ROM server cabin 201 are possible, wherein different types of networks, computer systems using different platforms, CD-ROM drives, and several other peripheral devices like printers etc are used.

2. Environment System

Figure 3:
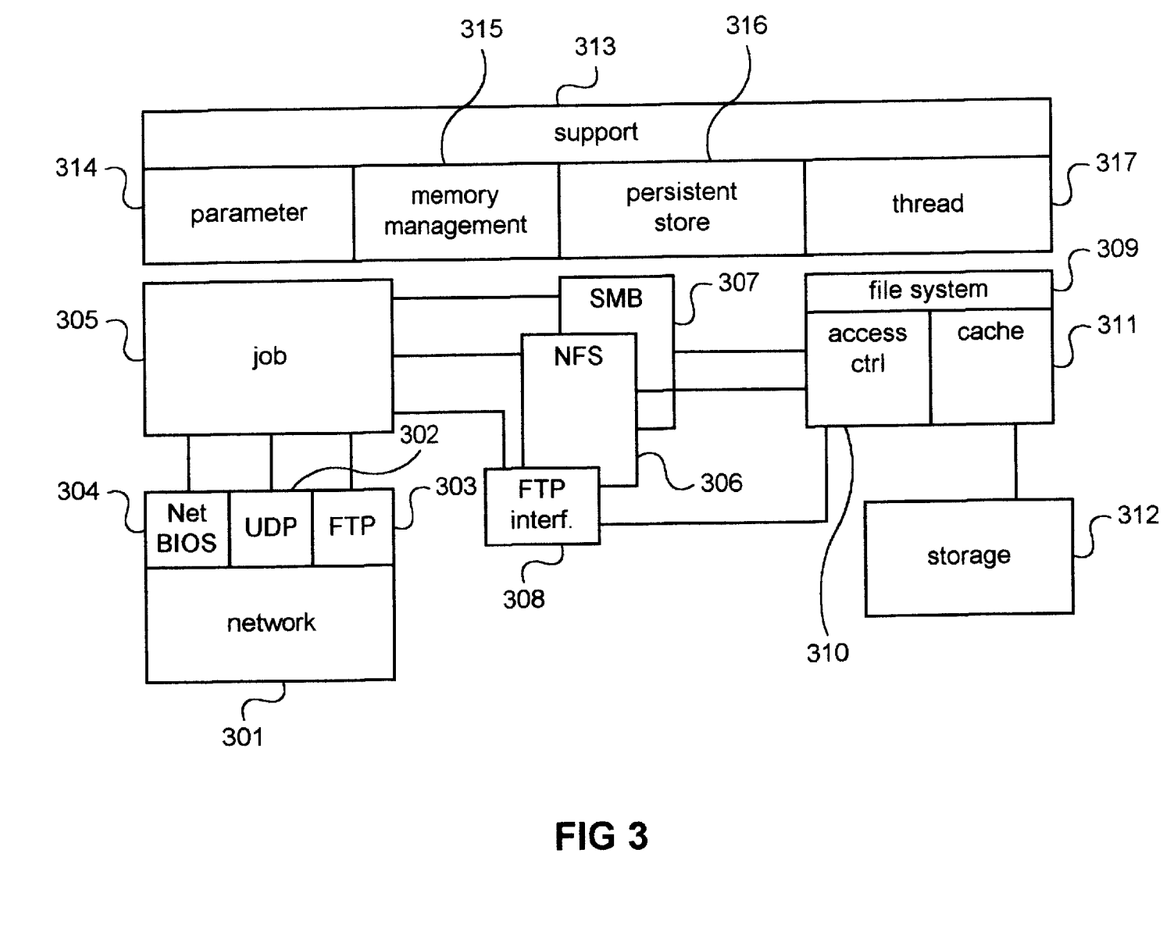
FIG. 3 shows a system environment of the CD-ROM server shown in FIG. 1.

The CD-ROM server 101 has an environment system, in the preferred embodiment consisting of a set of cooperating software modules shown in FIG. 3, the source codes of which, as previously described, are downloaded into the program memory 111. In the preferred embodiment, the system environment is implemented in C++ programming language, wherein the C++ Booch Components class library is used as standard class library. The environment system design is based on class hierarchy structures.

A module network 301, comprising a modified version of a protocol stack, designed by AXIS Communications AB of Lund, Sweden, and marketed under de trade name AXIS NPS 550, receives and sends packets over the computer network according to different protocols, which is an object of the present invention. The network 301 contains a protocol stack including the TCP/IP (Transmission Control Protocol/Internet Protocol) protocol suite developed by the U.S Department of Defense (DOD), the NetBIOS (Network Basic Input Output System protocol), and Netware® protocols developed by Novell Inc., USA.

As previously known, the TCP/IP protocol suite comprise four levels of implementation: 1. Network Interface, 2. IP (Internet protocol) and ICMP (Internet Control Message Protocol), 3. TCP (Transmission Control Protocol) and UDP (User Datagram Protocol), and 4. FTP (File Transfer Protocol)/SMTP (Simple Mail Transfer Protocol) and TELNET. The corresponding OSI (Open System Interconnection reference model) layers are: 1. Hardware, OSI layers 1–2, 2. Network, OSI layer 3, 3. Transport, OSI layer 4, and 4. Application, OSI layers 5–7.

The network 301 fully implements the protocols IP, ICMP, ARP (Address Resolution Protocol), RARP (Reverse Address Resolution Protocol), BOOTP (Boot Protocol) and TCP. Additional protocols could also be implemented. These implemented protocols handle: packet resending, (de) fragmentation, routing, etc. The network 301 includes three other modules UDP 302, FTP 303 and NetBIOS 304. The UDP 302 operates as a receiving interface of the current protocol stack on the UDP level and as a sending interface, which calls the level above the User Datagram Protocol level. The system environment and the hardware part communicate through these interfaces UDP 302, FTP 303, and NetBIOS 304, respectively, for sending and receiving packets. FTP (DOD standard, File Transfer Protocol) code, where FTP is an application protocol layered above TCP for moving ASCII, EBCDIC, and binary files from one system to another, is represented by the submodule FTP 303 in the network 301. It uses the same control data passing format as TELNET (also a DOD standard protocol). The purpose of an FTP is to transfer a file or a portion of a file from one system to another, under command of an FTP user. FTP file system operations are treated as jobs. A job FTPGetJob sends the requested file to a specified port and a job FTPPutJob puts the data from a specified port to a configuration file. NetBIOS (Network Basic Input Output System), represented by the network 301 submodule NetBIOS 304, is the transport protocol to be used by SMB (Server Message Block, developed by Microsoft®) protocol, located at the upper OSI layer (above NetBIOS). The SMB interface is used for file sharing. Many LAN C/S (Local Area Network Client/Server) installations use NetBIOS to transmit data between clients and servers in an MS-DOS environment. NetBIOS supports both session and datagram services. All communication with NetBIOS is done by submitting NCB commands or reading the status of already submitted NCBs.

The following NetBIOS commands are implemented in the referred embodiment:
Name services
NCB_ADD_GROUP_NAME
NCB_ADD_NAME
Session services
NCB_CALL
NCB_HANG_UP
NCB_LISTEN
NCB_SEND
NCB_RECEIVE
Datagram services
NCB_RECEIVE_BROADCAST_DATAGRAM
NCB_RECEIVE_DATAGRAM
NCB_SEND_BROADCAST_DATAGRAM
NCB_SEND_DATAGRAM As previously described, the network 301 sends and receives packets. It is obvious that the network is responsible for both creating output packets and sending them, as well as decoding and taking appropriate actions for input packets.

In the following description operations are denoted by their names followed by "( )" indicating that an operation may include one or several parameters.

An outgoing packet is described by a class OutPacket in the network 301. Three operations are provided for output packets: OutPacket( ) creates an OutPacket using Protocol; addData( ) adds a piece of data to the end of the packet; and send( ) sends the packet.

Inpackets are described by an abstract base class InPacket with several subclasses UDPInPacket, RPCInPacket NFSCallPacket, NetBIOSInPacket and SMBInPacket among others. The following operations are available on inpackets: decode( ) decodes and takes actions according to the contents of the packets; makeAnswer( ) adds appropriate data, e.g. source and destination number, to OutPacket necessary to create an answer to a current InPacket, depending on if the packet is an UDPInPacket or a NetBIOSInPacket etc; createAnswer( ) creates an OutPacket, calls makeAnswer( ) and returns an Outpacket; ignore( ) may be called during decoding if the packet can not be decoded further and must be trashed. UDP packets are described by the UDPInPacket class. It is responsible for decoding and creating of answers to UDP packets. This is obtained by the operation UDPInPacket( ), which creates an UDPInPacket with the specified origin. Further, the NetBIOSInPacket class describes an incoming NetBIOS packet and is responsible for decoding and creating answers to NetBIOS packets. A NetBIOS packet is created by executing NetBIOSInPacket( ), whereby a NetBIOSInPacket with the specified origin is created.

If the network 301 receives data packets from the net it decides if they are SMB or NFS (Network File System) packets. If it is any of these protocol types said network 301 generates decoding jobs for a module job 305.

The module job 305 is implemented as an abstract base class responsible for handling a set of ready-to-execute jobs. A created job waits until a server (in the client server meaning) is available. When a server is available it executes the current job by a function call, deletes it and goes for a new job to serve. Several servers are available in the system, serving a single pool of jobs. Three job operations are available: execute( ) calls doit( ) for some job in the set of ready to execute jobs if it is not empty, and if it is empty execute( ) waits until new jobs arrive; creatServer( ) creates a specified number of server threads; and said operation doit( ) is called by execute( ) when the current job is first in the job queue and execute( ) is called. The different jobs, which are executed in the system, are later described.

A module NFS 306 implements the NFS RPC(Remote Procedure Call) program. It also implements NFS call jobs, interprets NFS calls and translates them into operations on a file system. The NFS 306 comprises four job subclasses in the embodiment: NFSCallJob, NFSMountJob, RPCPortMapjob, and PCNFSDCallJob class, respectively. The NFSCallJob is responsible for decoding a packet containing an NFS call and, if possible, translates it to file system operations, builds an NFS answer packet and sends it. To obtain this an operation NFSCallJob( ) is provided, which creates an NFSCallJob and puts it into the job queue. The NFSMountJob is responsible for decoding a packet containing an NFS mount call and, if possible, translates it to file system operations, builds an answer packet and sends it. To obtain this an operation NFSMountJob( ) is provided, which creates an NFSMountJob and puts it into the job queue. Further, the RPCPortMapJob is responsible for decoding a packet containing a RPC portmap call and, if possible, answering it. This is obtained by an operation RPCPortMapjob( ), which creates an RPCPortMapJob and inserts it into the job queue. Further more PCNFSDCallJob decodes PCNFSD call jobs. These four classes are also the interface from the protocol stack to the other parts of the environment system for NFS. It is a narrow interface that makes it easy to replace the protocol stack. Additionally, NFS 306 also keeps information about who did the request, necessary information for access control handling, and caches a pointer to the requested file for later calls making file operations faster. The NFS 306 also implements some of the previously mentioned subclasses to the class InPacket, which subclasses decode RPC, NFS, Mount, Portmap, and PCNFSD packets, whereby RPC is a base class for the other three as they all use RPC. The UDPInPacket class have the following RPC procedure dispatchers: NFSUDPInPaket, MountUDPInPaket, PortMapuDPInPaket, and PCNFSDUDPInPaket, which are described later.

The SMB file sharing protocol is implemented by a separate module and is therefore represented by a separate module SMB 307 in FIG. 3. It implements SMB call jobs, interprets SMB calls and, if possible, translates them into operations on file system 309.

The SMB 307 comprises two job subclasses SMBCallJob and SMBLocalSessionClosedJob class, respectively. The SMBCallJob is responsible for decoding a packet containing an SMB call and, if possible, translates it to file system operations. An operation SMBCallJob( ) is provided in the SMBCallJob class, which creates an SMBCallJob and put it into the job queue. An SMBLocalSessionClosedjob( ) provided in the class SMBLocalSessionClosedJob creates an SMBLocalSessionClosedJob and puts it into the job queue. These two classes are also the interface from the NPS protocol stack of network 301 to the other parts of the environment system for SMB. It is a narrow interface that makes it easy to replace the protocol stack. Further, SMB 307 implements the previously mentioned two subclasses NetBIOSINpacket including a subclass SMBNetBIOSInPacket, and the SMBInPacket including the subclasses SMBDispatchPacket and SMBCallPacket. SMBNetBIOSInPacket and NetBIOSINpacket together provides an interface from the environment system to the NPS protocol stack of network 301 for SMB.

SMB 307 includes a User subclass. This subclass is called SMBUser and provides the following operations: file( ), returns a DataFilePointer pointing at a file associated with a FID (File IDentifier) or an invalid FilePointer if the FID is invalid; root( ) returns a DirectoryFilePointer pointing at the root directory for a TID (Tree IDentifier) or an invalid FilePointer if the TID is invalid; open( ) associates the file pointed to by the DataFilePointer with a FID and returns it, or if no free FID is available a 0 is returned; close( ) release the FID by deleting the file associated with it; treeConnect( ) registers a new tree connection and returns TID associated with the connection; treeDisconnect( ) frees the TID by releasing all resources associated with it; processExit( ) closes all files associated with a current PID (Process IDentifier); and seek( ) performs the seek operation on the file associated with the current FID.

Summing up, the NFS 306 and SMB 307 are application protocols connecting users with access rights and the requested files, and using the file system to access the files.

Code for interfacing FTP (File Transfer Protocol) to the file system is represented by the module FTP interface 308. It is basically the implementation of jobs created by the FTP 303 part of the network 301.

The file system 309 is responsible for the directory structure of the CD-ROM server 101. It provides a general interface to the file/directory hierarchy, which includes the CD-ROM drives 202 as well as pseudofiles for configuring the CD-ROM server (pseudo files are files stored in the working memory 115). The file system 309 gives access to the files in the file system by providing files, which may be data files or directory files. It is possible to read and write data from/to a data file. A directory file can look up a file name and iterate over directory records within the current directory file.

Access control 310 is a submodule of the file system 309, which provides access control to different parts of the file system and limits the number of simultaneous users on different volumes. A file system can consist of different volumes, each of which is a part of the file system with some specific access format. To the system the CD-ROM server 101 appears as a single CD-ROM drive even if more than one drive is connected. Each CD-ROM disc is represented by a separate directory in the file system. A second submodule of the file system 309 is a cache 311. It supplies the file system with memory blocks containing requested data. If the requested data exist within the cache 311, those data are returned, and if the requested data do not exist in the cache they are first read from the CD-ROM drive into the cache and then returned. For those skilled in the art of programming, no further details about the file system implementation are needed.

A module storage 312 contains an interface to the CD-ROM drive(s) 202 and handles automatic mounting and unmounting of CD-ROM volumes on the file system and data-reading from the CD-ROM volumes. Each CD-ROM drive is represented by an object, linked to a common SCSI object.

Support 313 is a subsystem containing modules used by some or all other subsystems. These modules are parameter 314, memory management 315, persistent store 316 and thread 317.

The parameter 314 handles parameters to adjust the behavior of the CD-ROM server 101. It is also possible to store/retrieve parameters to/from the CPM 116. Tailored object allocation is taken care of by the memory management 315. Responsible for storing and retrieving information stored in the CPM 116 is the persistent store 316. The thread 317 handles non-preemptive scheduling and provides threads, semaphores and timers. Threads are lightweight processes serving the jobs. These threads continue the handling of received packets and the logical continuation of the protocol stacks (NFS or SMB). Likewise, the network interface and the protocol stacks are executed as threads; the main thread. Only one thread executes at a time.

Figure 4:
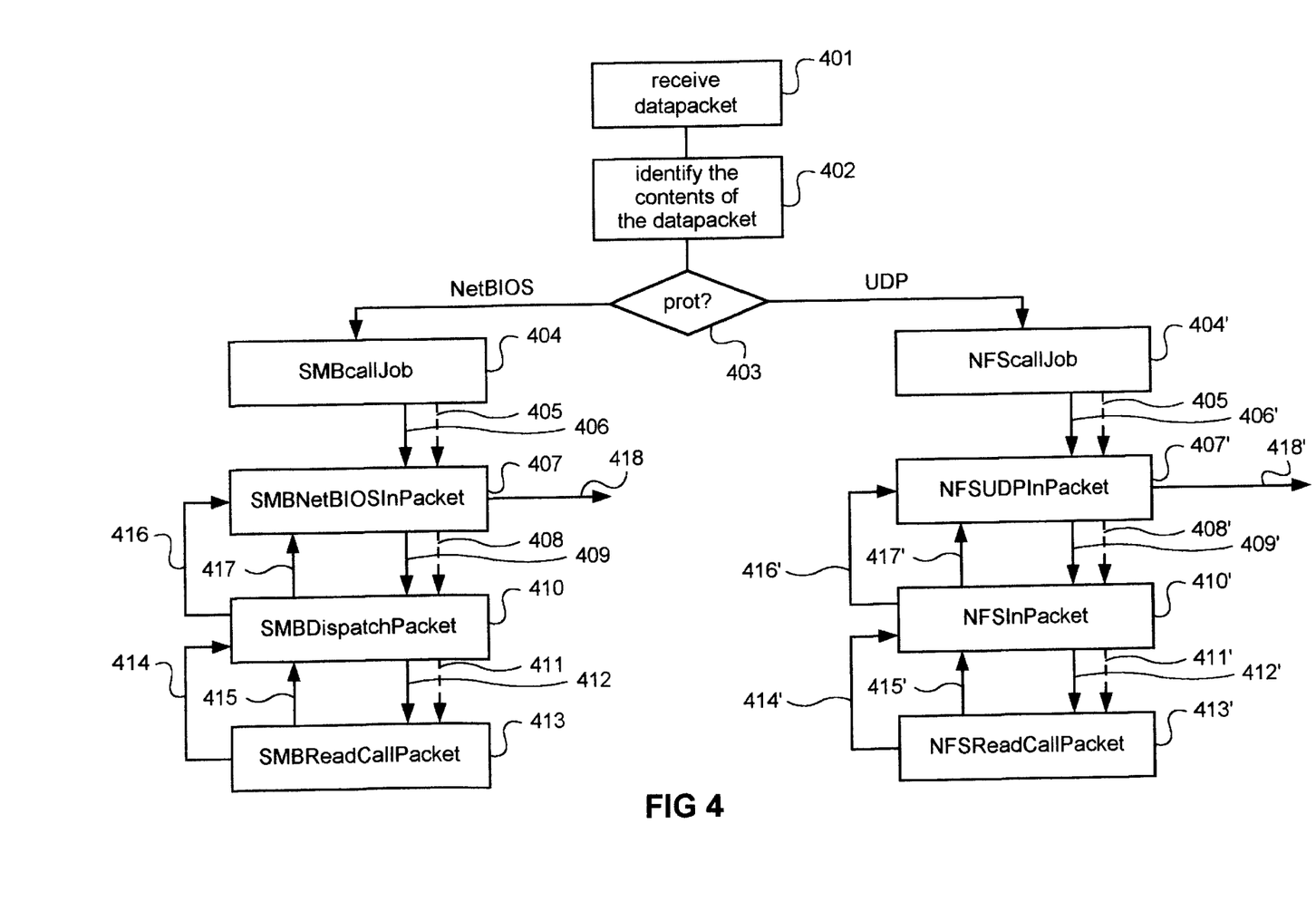
FIG. 4 is a flow diagram of the method according to the present invention.

FIG. 4 is a flow diagram of the method according to the present invention, describing an NFS read and an SMB read operation, is illustrated in FIG. 4. At step 401 the network 301 receives data packets from the computer network. The network 301 identifies the contents of the packets at step 402 and in dependence thereof the network takes appropriate actions at step 403.

If an SMB packet is received the NetBIOS 304, which is a part of the NPS protocol stack, creates an SMBCallJob at 404. The created job is put in a queue of ready-to-execute jobs for later execution. When the present job is first in the job queue the job 305 executes the job, removes it from the queue and deletes it. An execution of the SMBCallJob involves that the job creates an instance of SMBNetBIOSInPacket, illustrated by a dashed arrow 405, and then asks said instance to decode itself, illustrated by an unbroken arrow 406. At step 407 the SMBNetBIOSInPacket creates an instance of SMBDispatchPacket, illustrated by a dashed arrow 408, and then asks said instance to decode itself, illustrated by an unbroken arrow 409. At step 410 the SMBDispatchPacket dispatches the SMB request by creating an instance, illustrated by a dashed arrow 411, of a proper subclass to SMBCallPacket (depending on the contents of the packet) and then asks it to decode itself, illustrated by an unbroken arrow 412. If possible the contents of the packet are translated into a file system operation for the module file system 309 and the subclass to SMBCallPacket performs the operation at step 413. The SMBDispatchPacket is asked to make an answer, illustrated by an unbroken arrow 414 with the generated answer as a parameter 415. The SMBDispatchPacket asks the SMBNetBIOSInPacket to answer, illustrated by an unbroken arrow 416 with the generated answer as a parameter 417. The SMBNetBIOSInpacket sends the answer to the sender (the user), illustrated by an unbroken arrow 418.

If a UDP packet is received the UDP 302 creates a job which is responsible for either decoding NFS calls, NFS mount calls, or RPC portmap calls. In this example an NFSCallJob is created at 404'. The created job is put in a queue of ready-to-execute jobs for later execution. When the present job is first in the job queue the job 305 initiates execution of the job, removes it from the queue and deletes it. An execution of the NFSCallJob involves that the job creates an instance of NFSUDPInPacket, illustrated by a dashed arrow 405', and then asks said instance to decode itself, illustrated by an unbroken arrow 406'. At step 407' the NFSUDPInPacket creates an instance of NFSInPacket, illustrated by a dashed arrow 408', and then asks said instance to decode itself, illustrated by an unbroken arrow 409'. At step 410' the NFSInPacket dispatches the NFS procedure by creating an instance, illustrated by a dashed arrow 411', of a proper subclass to NFSCallPacket (depending on NFS procedure number) and then asks it to decode itself, illustrated by an unbroken arrow 412'. if possible the contents of the packet are translated into a file system operation for the module file system 309 and the subclass to NFSCallPacket performs the operation at step 413'. The NFSInPacket is asked to make an answer, illustrated by an unbroken arrow 414' with the generated answer as a parameter 415'. The NFSInPacket adds a RPC reply header and asks the NFSUDPInPacket to answer, illustrated by an unbroken arrow 416' with the generated answer as a parameter 417'. The NFSUDPInpacket sends the answer to the sender (the user), illustrated by an unbroken arrow 418'. Other operations than the read operation described above are handled in a similar way.

TCP packets, FTP packets etc are also handled in a similar way as NFS and SMB packets described above.

The function of the system is to make some operation(s) on a file, for example a data file or a directory file. In order to make that possible the environment system must have some kind of reference to that file. The NFS 306 operates to return a pointer either at a data file or a directory file depending on the contents of the supplied information.

The above described jobs use the file system 309 to get their tasks done. The file system 309, as previously described, is responsible for the directory structure of the CD-ROM server 101 and access files and directories through the storage 312. Two main operations on data files are implemented. They can either be read or in certain cases even written (not implemented for regular CD-drives). On directory files two operations are provided, namely a first operation which makes it possible to look up a file within the directory, and a second operation which returns a directory iterator capable of doing iterations over the directory records within the directory.

As early mentioned the system environment is implemented in C++ programming language. For those skilled in the art of programming it will be clear that other programming languages may be used. Alternatively, even the system environment may be implemented in hardware using standard digital design techniques, as also will be clear to those skilled in the art of digital hardware design.

Since the CD-ROM server 101 uses standard file sharing protocols, for example SMB and NFS, there is no need for any special software to access the CD-ROM server 101. No installation discs or tapes are needed. Each CD-ROM server 101 is able to connect several drives or a CD-ROM tower and simultaneously supports a variety of network operating systems like Microsoft® and IBM® Network Operating System etc. It is possible to restrict the access to any CD-ROM by either listing the users who are allowed to access it or by setting up password protection. It is also possible to limit the number of simultaneous users of any CD-ROM to comply with license agreements. Different protocols are also supported by the CD-ROM server 101. For example, it supports the Simple Network Management Protocol, SNMP, to allow remote management and trouble shooting of the server. A standard SNMP agent resides on the CD-ROM server, which collects network statistics and error messages to aid in trouble-shooting.

The CD-ROM server is connected as a node or a station in a network, like an Ethernet® network or a Token Ring® network, where it acts as a file server. To a computer the CD-ROM server appears as any other file server and it is accessed using the network operating system standard commands.

The CD-ROM server 101 described above, such as a general purpose CD-ROM server, could be included as a part of a variety of CD-ROM server versions.

Figure 5:
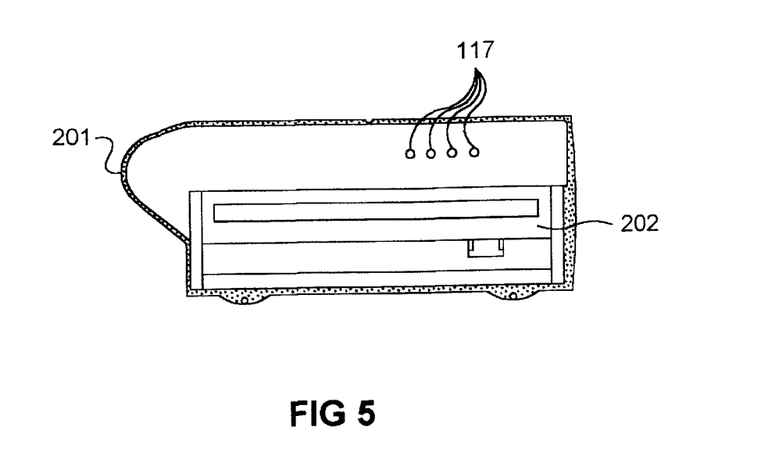
FIG. 5 is a front view of a CD-ROM server cabin containing the CD-ROM server shown in FIG. 1 and an internal CD-ROM drive.
Figure 6:
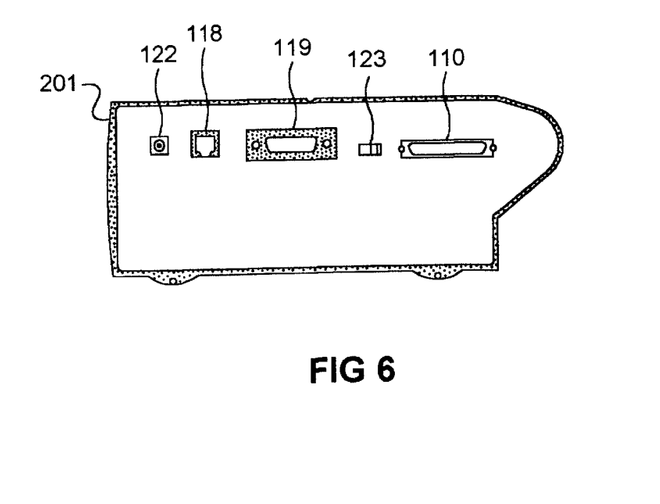
FIG. 6 is a rear view of the CD-ROM server cabin shown in FIG. 5.

The first embodiment, illustrated in FIGS. 5 and 6, is an Ethernet® and Token Ring® network version having room for an internal CD-ROM drive and attachment for up to six external CD-ROM drives. In FIG. 5 the CD-ROM drive 202 is arranged in the CD-ROM server cabin 201. The status LEDs 117 are also shown on the front. In the rear view of the CD-ROM server cabin 201, in FIG. 6, the two network connection means 118, 119, the CD-ROM drive connection means 110, an external power supply connector 122, and a ring speed switch 123 for Token Ring® network are shown.

Figure 7:
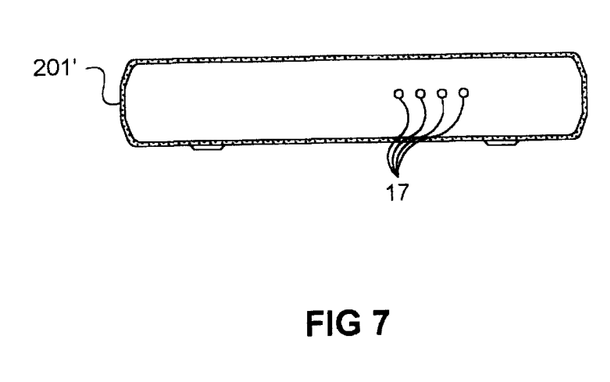
FIG. 7 is a front view of a CD-ROM server cabin containing the CD-ROM server shown in FIG. 1.
Figure 8:
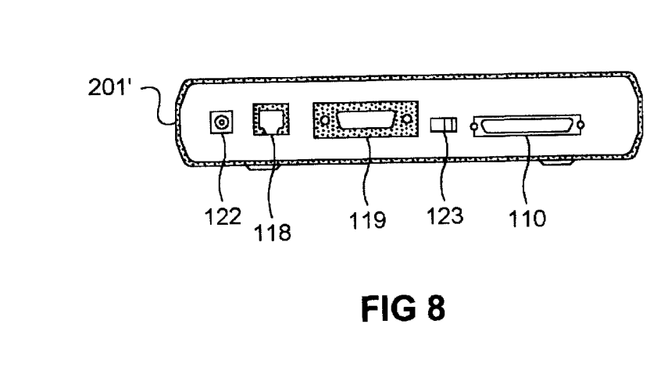
FIG. 8 is a rear view of the CD-ROM server cabin shown in FIG. 7.

FIGS. 7 and 8 show a second embodiment, an Ethernet® and Token Ring® network version CD-ROM server cabin 201' without an internal drive, which has attachment for up to seven external CD-ROM drives.

With the present invention the following advantages are obtained:

The CD-ROM server 101 allows all users in a network access to discs, regardless of computer systems. Connecting drives, jukeboxes, and towers directly to different networks as Ethernet® and Token Ring®, and it provides true multiple platform support. It provides workgroups requiring a CD-ROM drive with easy, local access to discs. The CD-ROM server 101 is easy to place anywhere in a computer network.

The CD-ROM server 101 works as a stand-alone device regardless of other file servers and their locations, which means less network load, higher performance and increased reliability. It also supports commonly used platforms like Windows™ for Workgroups, Windows™ 95, Windows™ NT, OS/2®, MS-DOS®, UNIX etc.

What is claimed is:

1. A method of providing computers connected to different networks using various network protocols, with shared access to files from any CD-ROM disc inserted into CD-ROM drives coupled to the computers via a server, and the method comprising the acts implemented on the server of:

receiving datapackets from the computers each requesting a file access operation in one of a plurality of application protocols;

identifying the transport protocol used in each of said datapackets;

creating jobs for each of the datapackets with each job defined in a selected one of a plurality of application protocols associated with the corresponding transport protocol identified in said identifying act;

translating each of the jobs created in said act of creating from the associated one of the plurality of application protocols into a file access operation; and executing each of the jobs translated in said act of translating to perform the file access operation requested in said act of receiving.

2. A method of claim 1, wherein the corresponding one of the plurality of transport protocols received in said act of receiving includes UDP (User Datagram Protocol) and the selected one of the plurality of application protocols associated with UDP in said act of creating jobs includes NFS (Network File System).

3. A method of claim 1, wherein the corresponding one of the plurality of transport protocols received in said act of receiving includes NetBIOS (Network Basic Input Output System) and the selected one of the plurality of application protocols associated with NetBios in said act of creating jobs includes SMB (Server Message Block).

4. A method of claim 1, wherein the corresponding one of the plurality of transport protocols received in said act of receiving includes TCP (Transmission Control Protocol) and the selected one of the plurality of application protocols associated with TCP in said act of creating jobs includes FTP (File Transfer Protocol).

5. A multiprotocol network CD-ROM server, providing computers coupled to different networks using various network protocols with shared access to files from any CD-ROM disc inserted into CD-ROM drives coupled to the computers via the multiprotocol CD-ROM server; and the CD-ROM server comprising:

a network module receiving datapackets from the computers each requesting a file access operation in one of a plurality of application protocols and identifying the transport protocol used in each of said datapackets;

a job module for creating jobs for each of the datapackets with each job defined in a selected one of a plurality of application protocols associated with the corresponding transport protocol identified by said network module;

a plurality of application modules each translating an associated one of the plurality of application protocols for each of the jobs created by said job module into a file access operation; and a file system module for executing each of the jobs translated by said plurality of application modules to perform the file access operation requested by the computers.

6. The multiprotocol network CD-ROM server of claim 5, wherein the corresponding one of the plurality of transport protocols received by said network module includes UDP (User Datagram Protocol) and the selected one of the plurality of application protocols associated with UDP includes NFS (Network File System).

7. The multiprotocol network CD-ROM server of claim 5, wherein the corresponding one of the plurality of transport protocols received by said network module includes NetBIOS (Network Basic Input Output System) and the selected one of the plurality of application protocols associated with NetBios includes SMB (Server Message Block).

8. The multiprotocol network CD-ROM server of claim 5, wherein the corresponding one of the plurality of transport protocols received by said network module includes TCP (Transmission Control Protocol) and the selected one of the plurality of application protocols associated with TCP includes FTP (File Transfer Protocol).

9. A multiprotocol network CD-ROM server, providing computer network users possibility to share information on CD-ROMs, providing users connected to different computer networks, using various network protocols, shared access to information from any CD-ROM disc inserted into a CD-ROM drive connected to the server, comprising:

means receiving a data packet from a sender via the computer network, means for storing a protocol stack, means for identifying, among protocols in said protocol stack, the transport protocol used in said packet;

means for creating a transport protocol inpacket of said packet;

means for decoding said transport protocol inpacket to find out the application protocol used;

means for creating an application protocol inpacket;

means for decoding said application protocol inpacket to identify an executable operation in accordance with an implemented operation of said application protocol;

means for decoding and translating said operation into a file system operation;

means for performing said file system operation;

means for making an answer packet to said sender according to said transport protocol; and means for sending said answer packet to said send.

* * * * *